UNITED STATES PATENT OFFICE.

WILLIAM L. WATSON, OF MONTREAL, CANADA.

COMPOUND FOR DESTROYING INSECTS ON PLANTS.

SPECIFICATION forming part of Letters Patent No. 465,789, dated December 22, 1891.

Application filed March 19, 1891. Serial No. 385,626. (No specimens.)

*To all whom it may concern:*

Be it known that I, WILLIAM L. WATSON, of the city of Montreal, Province of Quebec, Canada, have invented certain new and useful Improvements in Insect-Exterminating Compounds; and I do hereby declare that the following is a full, clear, and exact description of the same.

My invention has reference to those compounds which are at present sold in the form of powder, and when held in suspension in water sprinkled upon plants, &c., and has reference specially to the aceto-arsenite of copper, commonly called "paris-green." I propose to take this substance either at that stage of its manufacture when the precipitate is nearly dry or in the condition in which it is usually sold and combine with it gum-senegal in partial solution, the two being thoroughly incorporated together and molded, pressed, or formed into any shape or shapes desired and dried, the gum-senegal serving as a matrix for the particles of paris-green or like substance.

Up to the present time compounds have been used which contain flour as one of the essential elements; but it has been found from experiment that this does not give the same results as to solubility which the gum-senegal will produce, the reason being that the flour does not become dissolved sufficiently to render the solution completely devoid of lumpy particles, as is required in order that the same may freely pass through the fine sprinkling devices used in its distribution. Gum-tragacanth is also known in the art, and has been used in combination with flour, licorice, and cobalt; but I have by experiment proved that this gum does not equal the gum-senegal in point of rapid solution.

It will be seen that the transportation of the paris-green to the place where it is to be used and its application to the plant will be very much facilitated, as the "cake," if thrown into hot water, will dissolve instantaneously, and if into cold water will have the same result in a very short time and with but a little stirring, thus doing away with the tedious process of admixture at present in use. It also obviates any danger from poisoning on account of the absence of dust. Again, in an ordinary hot dry day the water in which the particles of paris-green are held in suspension is soon evaporated, and since there is then nothing to hold the paris-green on the leaf it is easily blown off, while in the present case the contents of the sprinkling-vessel, being to some extent adhesive, will help to hold the substance on the plant.

What I claim is as follows:

A soluble and adhesive insecticide consisting of an admixture of paris-green and gum-senegal for application to plants in thin solution form.

WM. L. WATSON.

Witnesses:
O. WM. N. WANE,
FRED. J. SEARS.